(12) United States Patent  
Delbridge et al.

(10) Patent No.: US 8,870,108 B2  
(45) Date of Patent: Oct. 28, 2014

(54) SPICE GRINDERS

(76) Inventors: Patrick J. Delbridge, Cape Town (ZA); David S. Delbridge, Cape Town (ZA)

( * ) Notice: Subject to any disclaimer, the term of this patent is extended or adjusted under 35 U.S.C. 154(b) by 534 days.

(21) Appl. No.: 13/263,970

(22) PCT Filed: Apr. 7, 2010

(86) PCT No.: PCT/IB2010/051509  
§ 371 (c)(1),  
(2), (4) Date: Dec. 29, 2011

(87) PCT Pub. No.: WO2010/116334  
PCT Pub. Date: Oct. 14, 2010

(65) Prior Publication Data  
US 2012/0091240 A1 Apr. 19, 2012

(30) Foreign Application Priority Data  
Apr. 8, 2009 (ZA) .................................. 2009/02432

(51) Int. Cl.  
*A47J 42/04* (2006.01)

(52) U.S. Cl.  
CPC ...................................... *A47J 42/04* (2013.01)  
USPC ..................................................... 241/169.1

(58) Field of Classification Search  
USPC ..................................................... 241/169.1  
See application file for complete search history.

(56) References Cited

U.S. PATENT DOCUMENTS

| 4,815,671 | A | 3/1989 | Akira |
| 6,663,031 | B2 | 12/2003 | Henderson et al. |
| 7,284,719 | B2 | 10/2007 | Delbridge et al. |
| 2005/0184177 | A1 | 8/2005 | Blouse et al. |

FOREIGN PATENT DOCUMENTS

| EP | 1989979 A1 | 11/2008 |
| WO | WO-0028870 A2 | 5/2000 |
| WO | WO2007093974 | * 8/2007 |

* cited by examiner

*Primary Examiner* — Mark Rosenbaum  
(74) *Attorney, Agent, or Firm* — Novak Druce Connolly Bove + Quigg LLP

(57) ABSTRACT

A spice grinder 14 is disclosed which comprises a first static component 12 including means for attaching it to a container 10, and a second rotatable component 16 which fits on the first component 12. The first component 12 has a tapering bore 26 with teeth 28 projecting inwardly from the surface of the bore 26, and the second component 16 has a toothed portion 44 in the bore. Grinding takes place in the gap between the teeth 28 44 of the components 12 16 when the second component 16 is rotated with respect to the first component 12. The second component 16 includes a transverse closure partition 34 with a set of openings 42 in it through which ground spice falls from the grinder 14 when it is in an inverted position, and a tamper evident closure component 54 seals off the openings 42. The grinder 14 can also include a stop element 88 secured to the second component 16. The stop element 88 encounters the first component 12 if an attempt is made to pull the second component 16 of the first component 12.

20 Claims, 5 Drawing Sheets

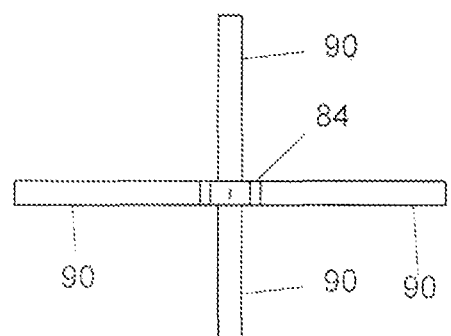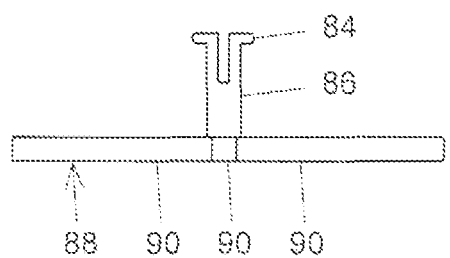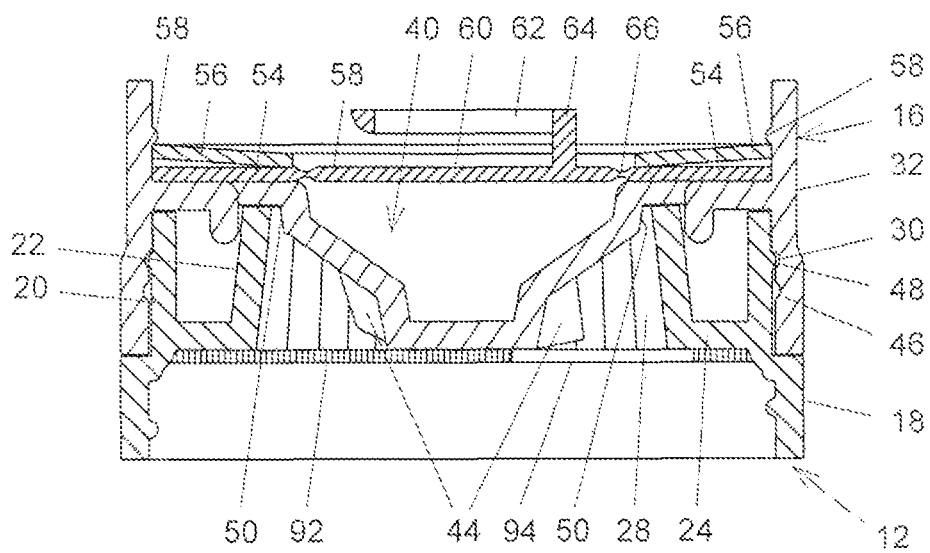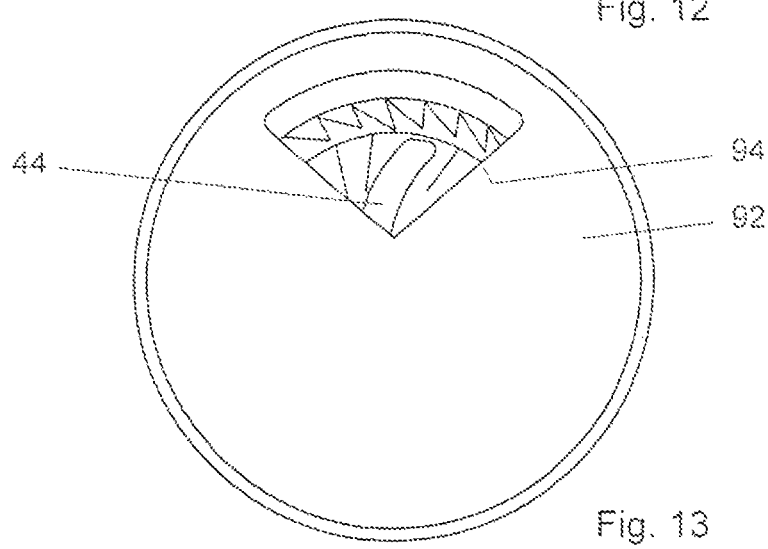

SPICE GRINDERS

CROSS-REFERENCE TO RELATED APPLICATIONS

This application is a 35 U.S.C. 371 National Stage Application of International Application No. PCT/IB2010/051509, filed Apr. 7, 2010, claiming priority from South African Application No. 2009/02432, filed Apr. 8, 2009, the entire contents of which are incorporated herein by reference in their entirety.

FIELD OF THE INVENTION

This invention relates to spice grinders.

BACKGROUND TO THE INVENTION

Spice grinders known to the Applicants comprise a first component that screws or snap fits onto a spice container such as a bottle. A second component fits onto the first component and is rotatable with respect to the first component. The components include teeth or serrations between which the spice is ground when the second component is rotated on the first component. With these known grinders it is not possible to see if the spice grinder has been tampered with.

To grind the peppercorns, the bottle to which the spice grinder is fitted is inverted and the parts of the grinder rotated relatively to one another. Ground pepper falls from the spice grinder. When the bottle is returned to its upright position, partially ground peppercorns, and ground pepper which has not fallen from the grinder, fall back into the bottle. Thus the bottle, after a period of use, contains peppercorns, peppercorn pieces and ground peppercorns. Hence, what is dispensed, after the bottle has been used for some time, is not freshly ground pepper but a mixture of freshly ground pepper and pepper ground at some earlier time.

The present invention seeks to provide a spice grinder which includes a means to indicate if the product has been tampered with. The invention furthermore seeks to provide a grinder in which the quantity of partially ground peppercorns and ground pepper which falls back into the bottle is minimised.

SUMMARY OF THE INVENTION

According to one aspect of the present invention there is provided a spice grinder which comprises a first static component including means for attaching it to a container, a second rotatable component which fits on the first component, the first component having a tapering bore with teeth projecting inwardly from the surface of the bore and the second component having a toothed portion in said bore, whereby grinding takes place in the gap between the teeth of the components when said second component is rotated with respect to the first component, the second component further having a transverse closure partition with a set of openings in it through which ground spice falls from the grinder when it is in an inverted position, and the spice grinder further including a third tamper evident closure component sealing off the openings.

The first static component may be adapted to be snap fitted to the container.

The tamper evident closure may comprise a disc with a removable part.

The tamper evident spice grinder may include a retainer to secure the disc to the second component. The retainer may be in the form of an annulus. In a specific form the annulus is frustoconical. The second component can include a skirt with an annular rib on the inner surface thereof, the outer periphery of the annulus fitting under said rib to secure the annulus in place.

The removable part may have a pull ring attached thereto.

The closure component may be made of a synthetic plastics material.

The removable part may be secured to the remainder of the closure component along a line of weakness in the plastics material.

The grinder may have interlocking circumferentially extending ribs and grooves, which permit the rotatable second component to be moved axially with respect to the first component and thereby to vary the spacing between the teeth of the rotatable component and the teeth of the static component.

According to a second aspect of the present invention there is provided a spice grinder which comprises a first static component including means for attaching it to a container, a second rotatable component which fits on the first component, the first component having a tapering bore with teeth projecting inwardly from the surface of the bore and the second component having a toothed portion in said bore, whereby grinding takes place in the grinding gap between the teeth of the components when said second component is rotated with respect to the first component, the first component having a transverse partition, the partition extending across the first component, the partition having an opening in it which permits spice to be ground to drop into the grinding gap upon inversion of the grinder to its position of use, and the partition limiting the quality of ground, partially ground and unground spice which falls through said opening back into the container when the spice grinder is inverted.

In one form of the invention the partition can be in the form of a disc. Said opening may be a generally triangular shape or a fan-shaped cut-out in the disc or it can be a cut-out that extends inwardly from the periphery of the disc.

The first static component may be adapted to be snap fitted to the container.

The grinder may have interlocking circumferentially extending ribs and grooves, which permit the rotatable second component to be moved axially with respect to the first component and thereby to vary the spacing between the teeth of the rotatable component and the teeth of the static component.

According to a third aspect of the present invention there is provided a spice grinder which comprises a first static component including means for attaching it to a container, a second rotatable component which fits on the first component, the first component having a tapering bore with teeth projecting inwardly from the surface of the bore and the second component having a toothed portion in said bore, whereby grinding takes place in the gap between the teeth of the components when said second component is rotated with respect to the first component, the second component having a locking member attached to the second component, the locking member being configured to bear on the first component if a force is applied to separate the second component from the first component thereby to restrict removal of the second component from the first component.

Said second component may include a socket and said locking member may include a split pin that fits into said socket.

The first static component may be adapted to be snap fitted to the container.

The grinder may have interlocking circumferentially extending ribs and grooves, which permit the rotatable second component to be moved axially with respect to the first component and thereby to vary the spacing between the teeth of the rotatable component and the teeth of the static component.

BRIEF DESCRIPTION OF THE DRAWINGS

For a better understanding of the present invention, and to show how the same may be carried into effect, the invention will now be described by way of non-limiting examples, with reference to the accompanying drawings in which:

FIG. 10 is a top plan view of the locking element of the spice grinder of FIG. 9;

FIG. 11 is a side elevation of the element of the spice grinder of FIG. 9;

FIG. 12 is a diametral section through a further form of spice grinder; and

FIG. 13 illustrates a detail of a spice grinder of FIG. 12.

DETAILED DESCRIPTION OF THE DRAWINGS

Figure 1:
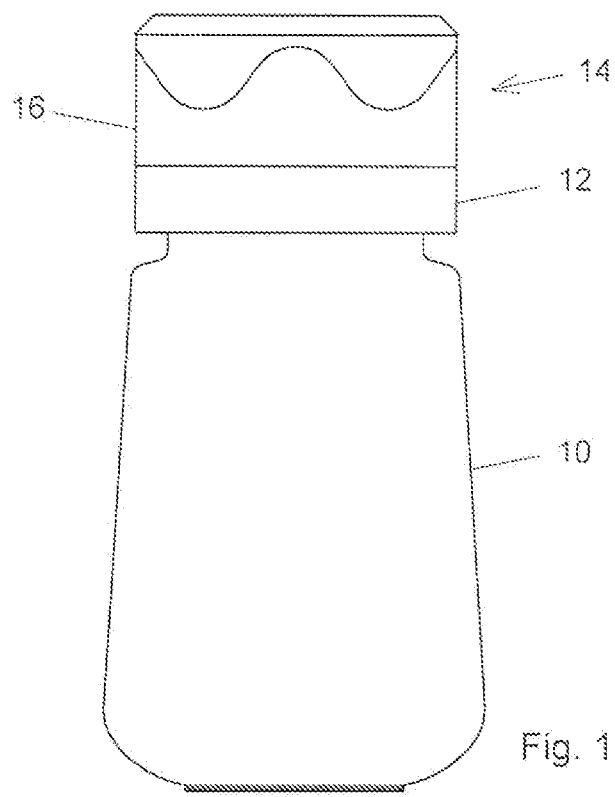
FIG. 1 is a side elevation of a bottle for containing peppercorns or other spices and having a spice grinder fitted thereto.

Referring to the drawings, a container 10 (FIG. 1) usually in the form of a glass bottle, has a' static component 12 of a spice grinder 14 snap fitted onto the neck thereof. A rotatable component 16 of the grinder 14 snap fits onto the static component 12 of the grinder 14.

Figure 2:
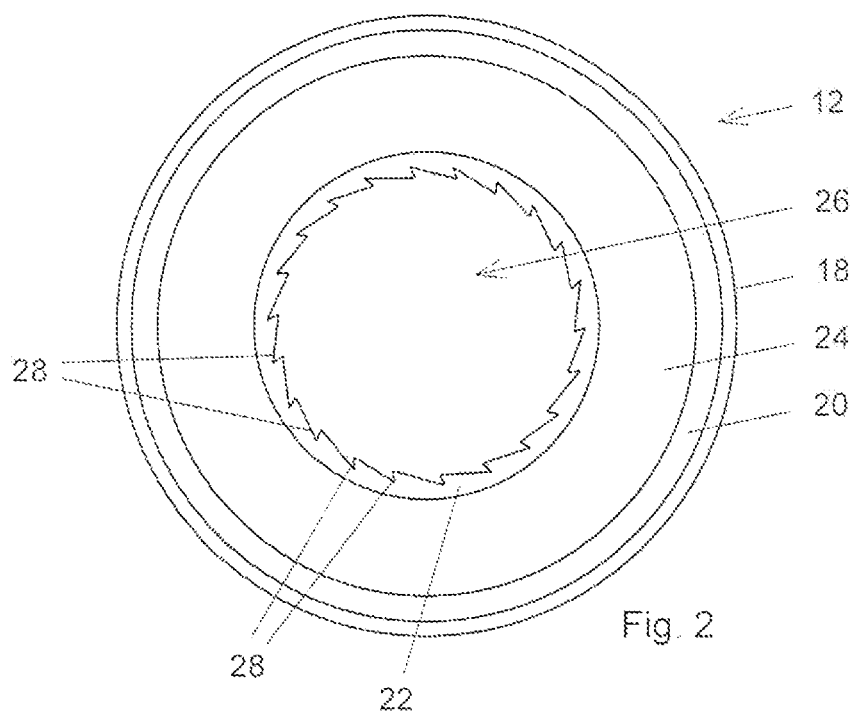
FIG. 2 is an underneath view of the static component of the spice grinder.

The component 12 (FIGS. 2 and 5) includes a skirt 18 that snap fits onto the container 10. Above the skirt 18 there is an outer sleeve 20 and an inner tapering sleeve 22. A circumferentially extending web 24 joins the sleeves 20 and 22 at their lower ends. The sleeve 22 has a conical bore 26 and teeth 28 protrude inwardly from the surface of the bore 26. Each tooth 28 is in the form of a rib which extends along the surface of the sleeve 22. Each rib is bounded by two intersecting surfaces of unequal width.

On the external surface of the component 12 there is a circumferentially extending rib 30.

Figure 3:
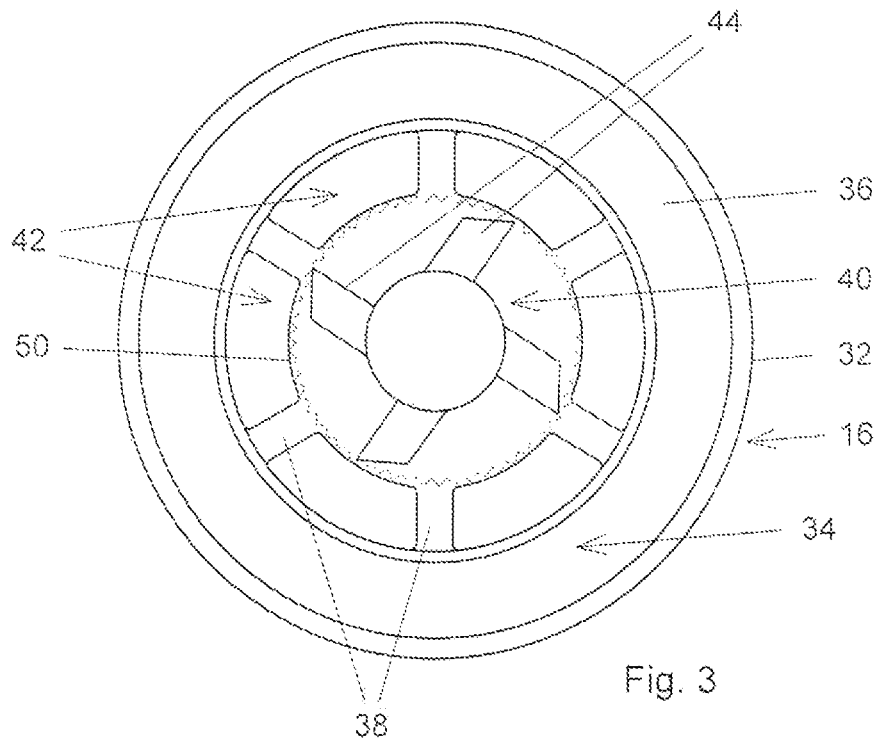
FIG. 3 is an underneath view of the rotatable component of the spice grinder.
Figure 4:
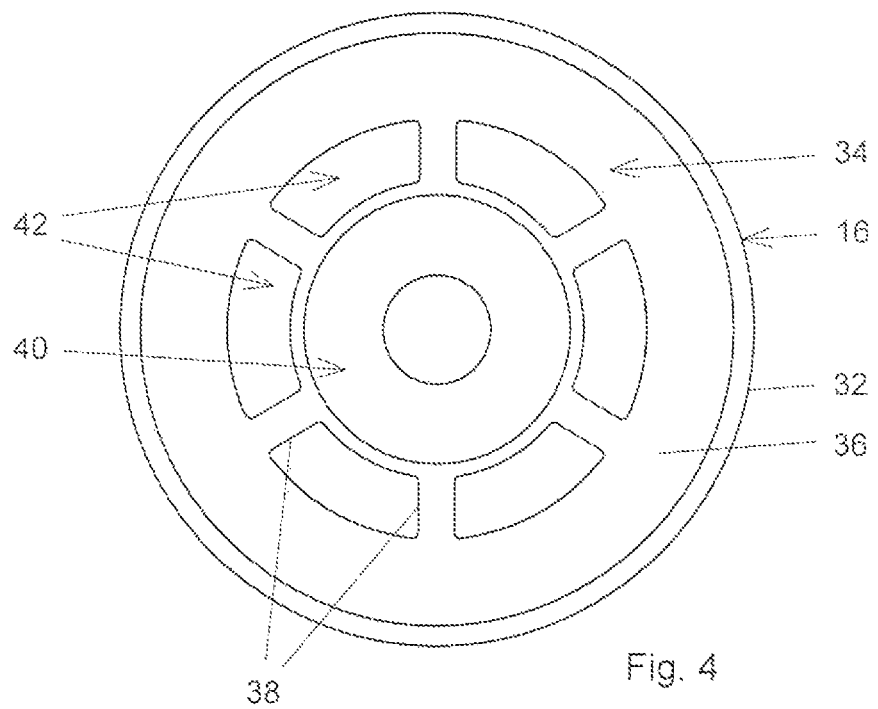
FIG. 4 is a top plan view of the component of FIG. 3.

The rotatable component 16 (FIGS. 3, 4 and 5) comprises an outer skirt 32 and a spider 34. The spider 34 includes an outer ring 36, radial spokes 38 and a cone 40 forming the centre of the spider 34. The openings between the spokes 38 are designated 42.

The cone 40 is closed at its lower end and joined, at its upper end, to the ring 36 by the spokes 38 which extend outwardly from the cone 40. On the outside of the cone there are four equally spaced protruding teeth 44 (see particularly FIG. 3).

Two parallel internal grooves 46, 48 (FIG. 5) are provided on the inner cylindrical face of the skirt 32.

Figure 5:
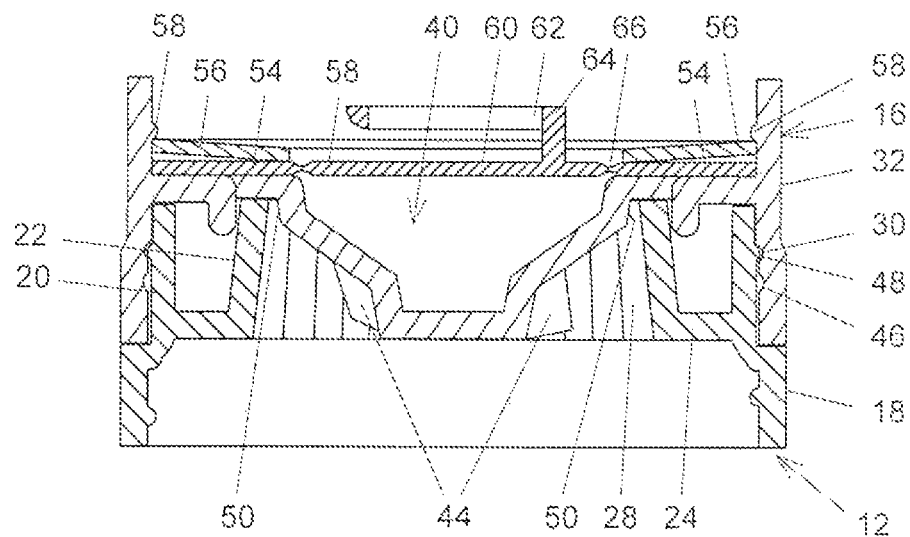
FIG. 5 is a diametral section through the spice grinder.

As shown in FIG. 5, the sleeve 20 fits in the sleeve 32, the rib 30 snapping into one or other of the grooves 46,48 depending on how far the sleeve 20 is pushed into the sleeve 32.

The angled teeth 44 break the pepper corns but do not grind them. They also push the corns towards the fine grinding zone, constituted by the teeth 50 which are provided around the outer surface of the cone 40 at its wider end.

When the grinder is inverted from the position shown in FIG. 5, peppercorns drop into the gap between the cone 40 and the sleeve 22. As the component 14 is rotated on the component 12, the teeth 28 and 44 break the peppercorns between them. The teeth 50, which co-operate with the parts of the teeth 28 which are at the smaller diameter end of the bore 26, act as a fine grinding structure. The fragments drop out of the grinder through the annular gap (not shown) between the inner edge of the sleeve 22 and the widest part of the cone 40. This gap registers with the radially inner parts of the openings 42.

If the component 16 is pulled up from the position shown in FIG. 5 so that the rib 30 leaves the groove 48 and snaps into the groove 46, the teeth 50 on the surface move towards the teeth 28, and the peppercorns will now be ground to a smaller particle size before falling through the gap.

Figure 6:
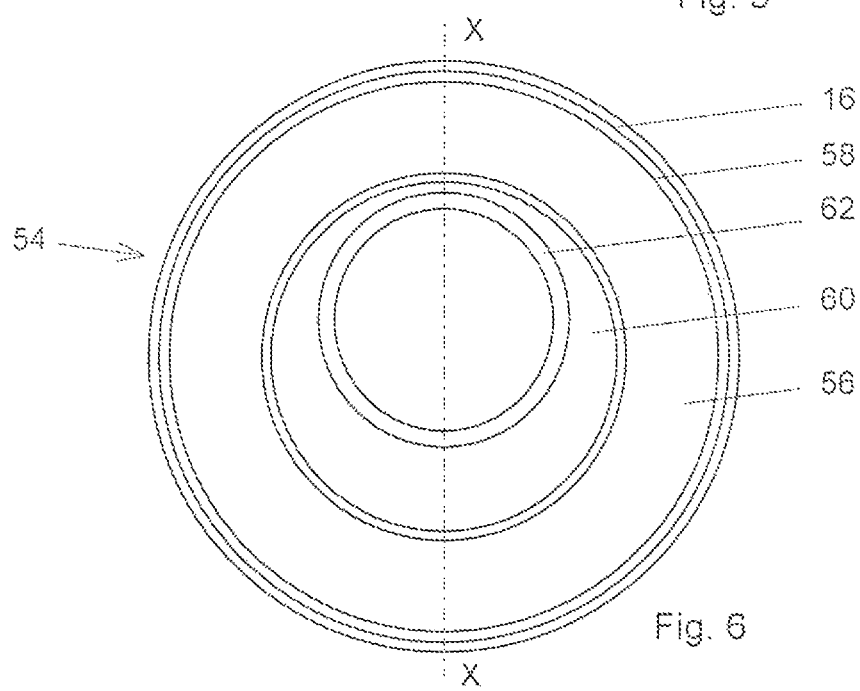
FIG. 6 is a top plan view of the component of FIG. 3 sealed off with a tamper evident closure component.
Figure 7:
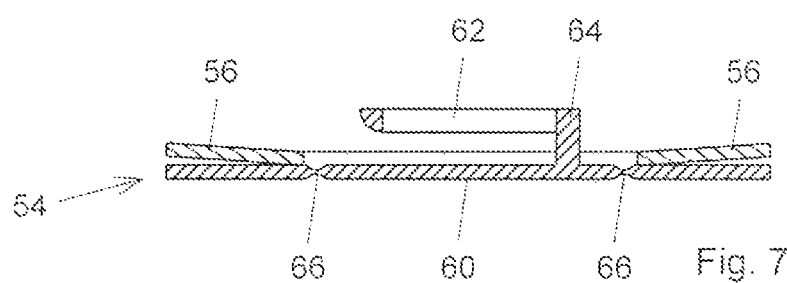
FIG. 7 is a section on line X-X of FIG. 6, FIG. 7 showing the tamper evident component and also showing a retainer.

The spice grinder further includes a tamper evident closure component 54 in the form of an annular disc that fits into the rotatable component 16 (see FIGS. 5, 6 and 7). The closure component 54 is secured within the component 16 by an annular retainer 56. The retainer, in radial section, as best seen in FIGS. 5 and 7, slopes from its outer periphery to its inner periphery so that it is dished in form.

An internal rib 58 (FIG. 5) is provided on the inner cylindrical face of the skirt 32 of the rotatable component 16 above the ring 36 of the spider 34. The outer periphery of the annular retainer 56 snap fits under the internal rib 58, thereby securing the closure component 54 within the rotatable component 16.

The closure component 54 (see FIGS. 5, 6 and 7) has a circular removable part 60 with a pull ring 62 attached thereto by way of a column 64. An annular line of weakness 66 in the closure component 54 facilitates removal of the removable part 60. The removable part 60 closes off the openings 42 and removal thereof is an indication that the spice grinder has been tampered with.

Figure 8:
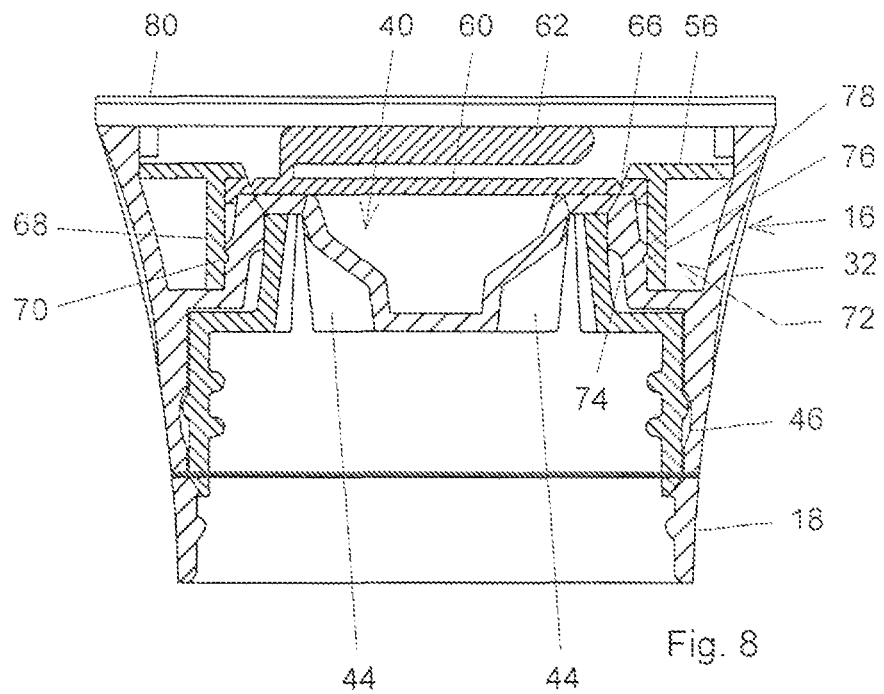
FIG. 8 is a cross-section through a spice grinder with a further form of tamper evident closure component.

The embodiment of FIG. 8 has many parts in common with the grinder of FIGS. 1 to 7 and like numerals are used to designate like parts.

The retainer 56 is not dished but is extended downwardly by a sleeve 68 which has a circumferentially extending rib 70 on the radially inner face thereof. The configuration of the static component 16 differs from that of the static component of FIGS. 1 to 7 in that the spider 34 defines an annular well 72. The radially inner side of the well 72 is constituted by a circumferentially extending wall 74. The wall 74 has, on the radially outer face thereof, a continuous groove 76 and rib 78. The rib 70 fits into the groove 76 below the rib 78. The inner periphery of the retainer 56 overlaps the circumferential edge of the component 54 outwardly of the line of weakening 66.

A removable closure cap is shown at 80.

Figure 9:
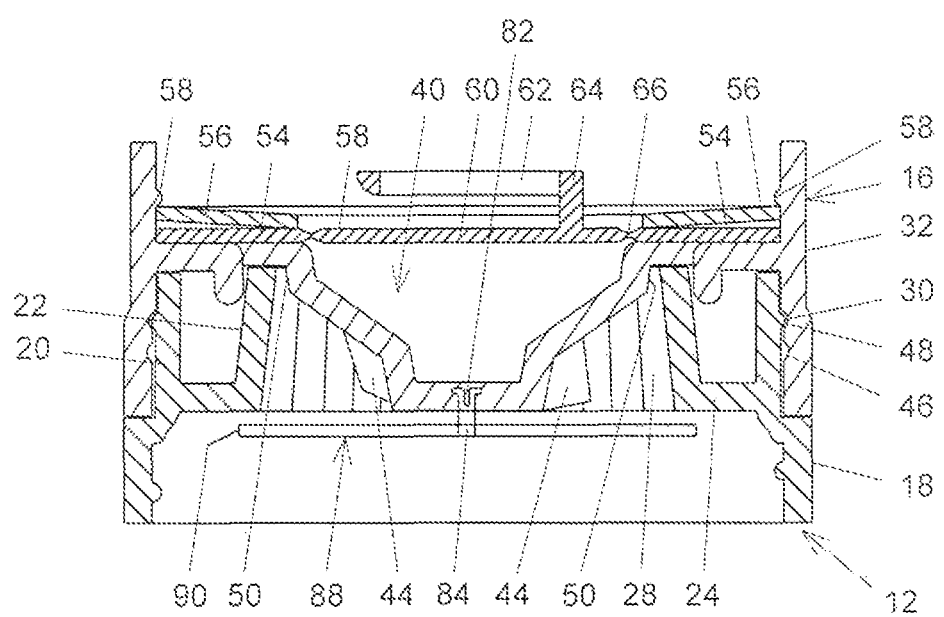
FIG. 9 is a section through a spice grinder in which a locking element is provided to prevent the rotatable component being separated from the static component.

In FIG. 9 the closed lower end of the cone 40 is formed with a socket 82. This receives a split spigot 84 (FIG. 11) at the free end of a stub shaft 86 which itself forms part of a stop element 88. The element 88, as best seen in FIG. 10, is in the form of a cross with spokes 90 extending outwardly from the stub shaft 86. A strong material such as a polycarbonate is used in the manufacture of the element 88. During assembly, the parts 12 and 16 are snap-fitted together and the spigot 84 is then pushed into the socket 82. The assembled grinder is then snap-fitted onto the bottle 12.

If the part 16 is pulled upwardly with respect to the part 12, the outer ends of the spokes 90 bear on the underside of the web 24 of the static part 12, thereby preventing separation of the parts.

In FIGS. 12 and 13 a partition 92 is shown which fits tightly into the component 12 and which has an opening 94 in it. When the container 10 with the spice grinder attached is inverted, peppercorns fall through the opening 94 into the grinding gap. Relative rotation, between the static component 12 and the rotatable component 16, results in the peppercorns being pushed away from the opening 94 by the teeth 44.

When the spice grinder is returned to its upright condition, only the ground and partly ground peppercorns in the immediate vicinity of the opening 94 fall back into the container. Most of the material in the grinding gap falls onto the partition 92 where it is retained for grinding when the container is next inverted.

The invention claimed is:

1. A spice grinder which comprises a first static component including means for attaching it to a container, a second rotatable component which fits on the first component, the first component having a tapering bore with teeth projecting inwardly from the surface of the bore and the second component having a toothed portion in said bore, whereby grinding takes place in the gap between the teeth of the components when said second component is rotated with respect to the first component;
wherein the second component further has a transverse closure partition with a set of openings in it through which ground spice falls from the grinder when it is in an inverted position, and the spice grinder further including a tamper evident closure component sealing off the openings.

2. A spice grinder as claimed in claim 1, wherein the first static component is adapted to be snap fitted to the container.

3. A spice grinder as claimed in claim 2, wherein the tamper evident closure component comprise a disc with a removable part.

4. A spice grinder as claimed in claim 3, comprising a retainer to secure the disc to the second component.

5. A spice grinder as claimed in claim 4, wherein the retainer is in the form of an annulus.

6. A spice grinder as claimed in claim 5, the annulus is frustoconical.

7. A spice grinder as claimed in claim 5, wherein the second component includes a skirt with an annular rib on the inner surface thereof, the outer periphery of the annulus fitting under said rib to secure the annulus in place.

8. A spice grinder as claimed in claim 3, wherein the removable part has a pull ring attached thereto.

9. A spice grinder as claimed in claim 3, wherein the closure component is made of a synthetic plastics material.

10. A spice grinder as claimed in claim 9, wherein the removable part is secured to the remainder of the closure component along a line of weakness in the plastics material.

11. A spice grinder as claimed in claim 3, wherein by interlocking circumferentially extending ribs and grooves, which permit the rotatable second component to be moved axially with respect to the first component thereby to vary the spacing between the teeth of the rotatable component and the teeth of the static component.

12. A spice grinder which comprises a first static component including means for attaching it to a container, a second rotatable component which fits on the first component, the first component having a tapering bore with teeth projecting inwardly from the surface of the bore and the second component having a toothed portion in said bore, whereby grinding takes place in the grinding gap between the teeth of the components when said second component is rotated with respect to the first component;
wherein the first component has a transverse partition, the partition extending across the first component, the partition having an opening in it which permits spice to be ground to drop into the grinding gap upon inversion of the grinder to its position of use, and the partition limiting the quality of ground, partially ground and unground spice which falls through said opening back into the container when the spice grinder is inverted.

13. A spice grinder as claimed in claim 12, wherein the partition is in the form of a disc.

14. A spice grinder as claimed in claim 13, wherein said opening is of generally triangular shape.

15. A spice grinder as claimed in claim 13, wherein said opening is a generally fan-shaped cut-out in the disc.

16. A spice grinder as claimed in claim 12, wherein said opening is of generally triangular shape.

17. A spice grinder as claimed in claim 12, wherein said opening is a generally fan-shaped cut-out in the disc.

18. A spice grinder as claimed in claim 12, wherein said opening is a cut-out that extends inwardly from the periphery of the disc.

19. A spice grinder which comprises a first static component including means for attaching it to a container, a second rotatable component which fits on the first component, the first component having a tapering bore with teeth projecting inwardly from the surface of the bore and the second component having a toothed portion in said bore, whereby grinding takes place in the gap between the teeth of the components when said second component is rotated with respect to the first component; and
there being a locking member attached to the second component, the locking member being configured to bear on the first component if a force is applied to separate the second component from the first component thereby to restrict removal of the second component from the first component.

20. A spice grinder as claimed in claim 19, wherein said second component includes a socket and said locking member includes a split pin that fits into said socket.

* * * * *